United States Patent [19]
Parry

[11] Patent Number: 6,021,055
[45] Date of Patent: Feb. 1, 2000

[54] INTENTIONAL CROSS CONDUCTION OF CONVERTER CIRCUIT TO IGNITE HIGH IGNITION VOLTAGE LOADS

[75] Inventor: John E. Parry, Redondo Beach, Calif.

[73] Assignee: International Rectifier Corporation, El Segundo, Calif.

[21] Appl. No.: 09/160,078

[22] Filed: Sep. 24, 1998

[51] Int. Cl.[7] .................................................. H02M 7/517
[52] U.S. Cl. .......................................... 363/49; 363/131
[58] Field of Search ................................ 363/16, 17, 24, 363/49, 131, 132, 133, 134

[56] References Cited

U.S. PATENT DOCUMENTS

| | | | |
|---|---|---|---|
| 4,298,925 | 11/1981 | Melling | 363/131 |
| 4,408,270 | 10/1983 | Anderson et al. | 363/134 |
| 5,644,479 | 7/1997 | Yoshida et al. | 363/131 |
| 5,748,457 | 5/1998 | Poon et al. | 363/131 |
| 5,754,413 | 5/1998 | Fraidlin et al. | 363/17 |
| 5,761,055 | 6/1998 | Okada et al. | 363/16 |
| 5,768,111 | 6/1998 | Zaitsu | 363/16 |
| 5,768,112 | 6/1998 | Barrett | 363/132 |
| 5,838,552 | 11/1998 | Fraidlin et al. | 363/16 |
| 5,930,121 | 7/1999 | Henry | 363/16 |

FOREIGN PATENT DOCUMENTS 0130952  1/1985  European Pat. Off. ............... 363/131

*Primary Examiner*—Jeffrey Sterrett
*Attorney, Agent, or Firm*—Ostrolenk, Faber, Gerb & Soffen, LLP

[57] ABSTRACT

A circuit for igniting and driving a high ignition voltage load includes first and second series coupled switches arranged in a half bridge circuit having an output node. A step-up transformer has a primary winding that is coupled to the bridge circuit at the output node. A load is coupled to the secondary winding to a return potential. Both the first and second switches are capable of being turned on concurrently for a predetermined interval to supply an ignition voltage across the secondary winding sufficient to ignite the lamp.

16 Claims, 4 Drawing Sheets

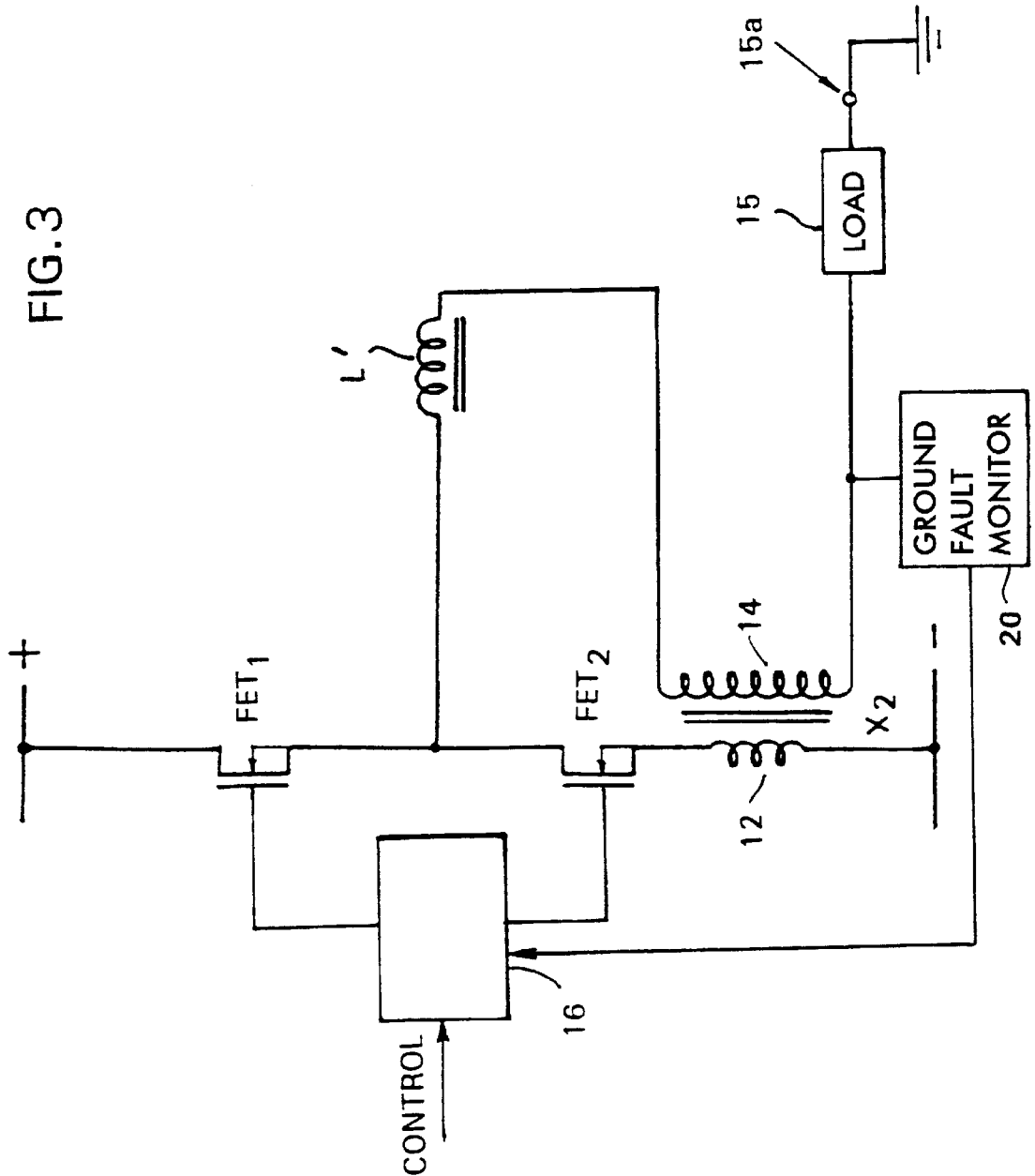

INTENTIONAL CROSS CONDUCTION OF CONVERTER CIRCUIT TO IGNITE HIGH IGNITION VOLTAGE LOADS

FIELD OF THE INVENTION

The present invention relates to electrical circuits and processes for starting and restarting high ignition voltage loads such as gas discharge lamps and, more particularly, to a novel combined driving and ignition circuit where devices are timed such that intentional cross-conduction occurs during ignition mode.

BACKGROUND OF THE INVENTION

It is well known in the art that high ignition voltage loads, such as gas discharge lamps, commonly operate in a starting mode, an operating or steady state mode, and a restrike mode. During the starting mode, a relatively higher starting voltage or ignition voltage is required across electrodes of the gas discharge lamp to first place the gases of the lamp into a suitable ionized condition for initiating a glow breakdown state.

Prior art ignitor circuits generally include a pulse transformer with a separate firing circuit capable of producing a high voltage pulse and a drive circuit controlling an H-bridge or a ½ bridge connected to the gas discharge lamp. The ½ bridge comprises two (2) transistors, such as field effect transistors (FETs), only one of which is "on" at any given moment of operation. Simultaneous "on" states of the two FETs is guarded against in the prior art circuits to prevent damage to the circuit.

During the starting mode, an initial high voltage pulse is generated by the pulse transformer and firing circuit and applied to the gas discharge lamp. After the starting mode, and during the operation or conduction mode, a relatively lower voltage is applied across the gas discharge lamp through the FETs which are alternatively turned on and off.

However, the firing circuit is only operational during the relatively brief ignition mode and is dormant otherwise. Thus, there is no need for the firing circuit except during the ignition mode. The firing circuit requires precise control both as to the duration of its operation and its coordination with the driving circuit, which may be difficult to achieve because the firing circuit is separate from the driving circuit. Thus, a deficiency in the prior art is the inefficient implementation of a distinct firing circuit and the corresponding hardware to achieve its precise control.

Accordingly, there is a need in the art for an improved ignition circuit for high ignition voltage resonant loads which permits the elimination of a distinct firing circuit and a corresponding reduction of the associated hardware.

BRIEF SUMMARY OF THE INVENTION

The circuit of the invention eliminates the above-described problems by utilizing a fourth state of operation of a two FET ½ bridge to achieve a momentary spike in voltage to cause ignition of the lamp. The fourth state of a two FET ½ bridge is when both FETs are "on"; the third and second states are when one or the other of the two FETs is "on" respectively; and the first state is when both FETs are "off".

The novel circuit comprises first and second series coupled switches forming a half bridge circuit having an output node. A step-up transformer has a primary winding and secondary winding. The secondary winding has first and second ends, and the primary winding is series coupled with the bridge circuit. The first end of the secondary winding is coupled to the output node of the bridge. A load is coupled from the second end of the secondary winding to a return potential. Both the first and second switches are capable of being biased on simultaneously for a short predetermined interval of time in order to cause an ignition voltage across the secondary winding sufficient to ignite the lamp.

The novel circuit produces a significant cost-saving and reduction of component-count over alternative designs by eliminating the need for a distinct firing circuit, associated controls and associated hardware. Performance is enhanced due to more precise control of the time of ignition operation and the voltage of ignition.

Another embodiment of this invention includes a control circuit for controlling the application of alternating current power to a load. The control circuit comprises at least a first and a second switch means that are each operable between a conductor and non-conductor condition and a control means coupled to each of the first and second switches to operate the switches between their conductor and non-conductor conditions. The first and second switch means are connected in series with a direct current source and being connected together at a node. A transformer has a low voltage winding and a high voltage winding. The low voltage winding is connected in series with the first and second switches and the direct current source. The high voltage winding is connected to the node and in series with the load. The control means is operable in a start mode to simultaneously turn on both of the first and second switches, thereby to induce a relatively high voltage in the high voltage winding and in series with said load, and thereafter to alternately turn on the first and second switches for respective non-overlapping controlled conductive periods, thereby to apply alternating current power to said load.

BRIEF DESCRIPTION OF THE DRAWINGS

FIG. 3 is a schematic diagram of an embodiment of the circuit of FIG. 2, in which the switches are power MOSFETs.

DETAILED DESCRIPTION OF THE INVENTION

Figure 1:
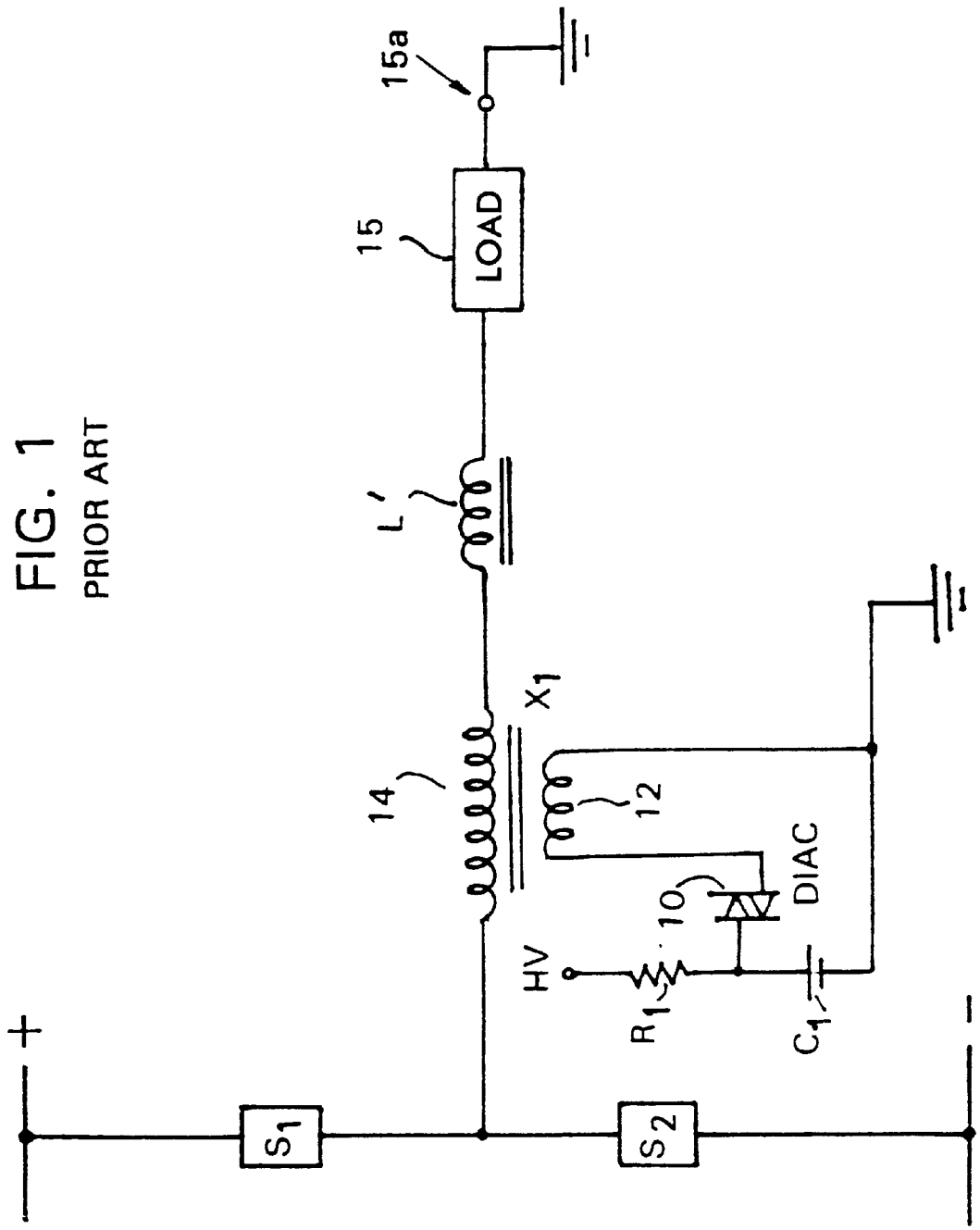
FIG. 1 is a schematic diagram of a prior art ½ bridge ballast circuit for gas discharge lamps, such as fluorescent lamps.

The circuit of FIG. 1 is a basic known self-oscillating ½ bridge comprising switch devices $S_1$ and $S_2$, which may be transistors for example, for outputting a square wave frequency. The ½ bridge is fed by direct current, which the ½ bridge converts into a square wave. Also shown is a distinct firing circuit comprising a break-over device such as DIAC 10, resistor $R_1$ and capacitor $C_1$. The firing circuit is coupled to the low voltage or primary winding 12 of transformer $X_1$. The transformer's high voltage or secondary winding 14 is connected through inductor L (or through a conventional LC circuit) to the load circuit 15 which may be a fluorescent lamp. Note that any other load circuit could be used. Note also that the transformer may be an auto transformer. Concurrent forward conduction of both switches $S_1$ and $S_2$ never occurs intentionally in this circuit.

In operation, capacitor $C_1$, which is supplied by a high voltage power source HV, charges through $R_1$ until the voltage across capacitor $C_1$ reaches break-over voltage of the DIAC 10. The timing of the break-over is a control problem in the prior art. As soon as DIAC 10 fires, the energy in capacitor $C_1$ is delivered to the primary winding 12 of transformer $X_1$, which induces a high ignition voltage in its secondary winding 14, thus firing the load 15. Regulation may be provided by a ballast inductor $L^1$ in conjunction with the high switch frequency or by a regulation block feeding the half bridge or full bridge. Inductor $L^1$ is not needed if there is no regulation to the half bridge feed.

Figure 2:
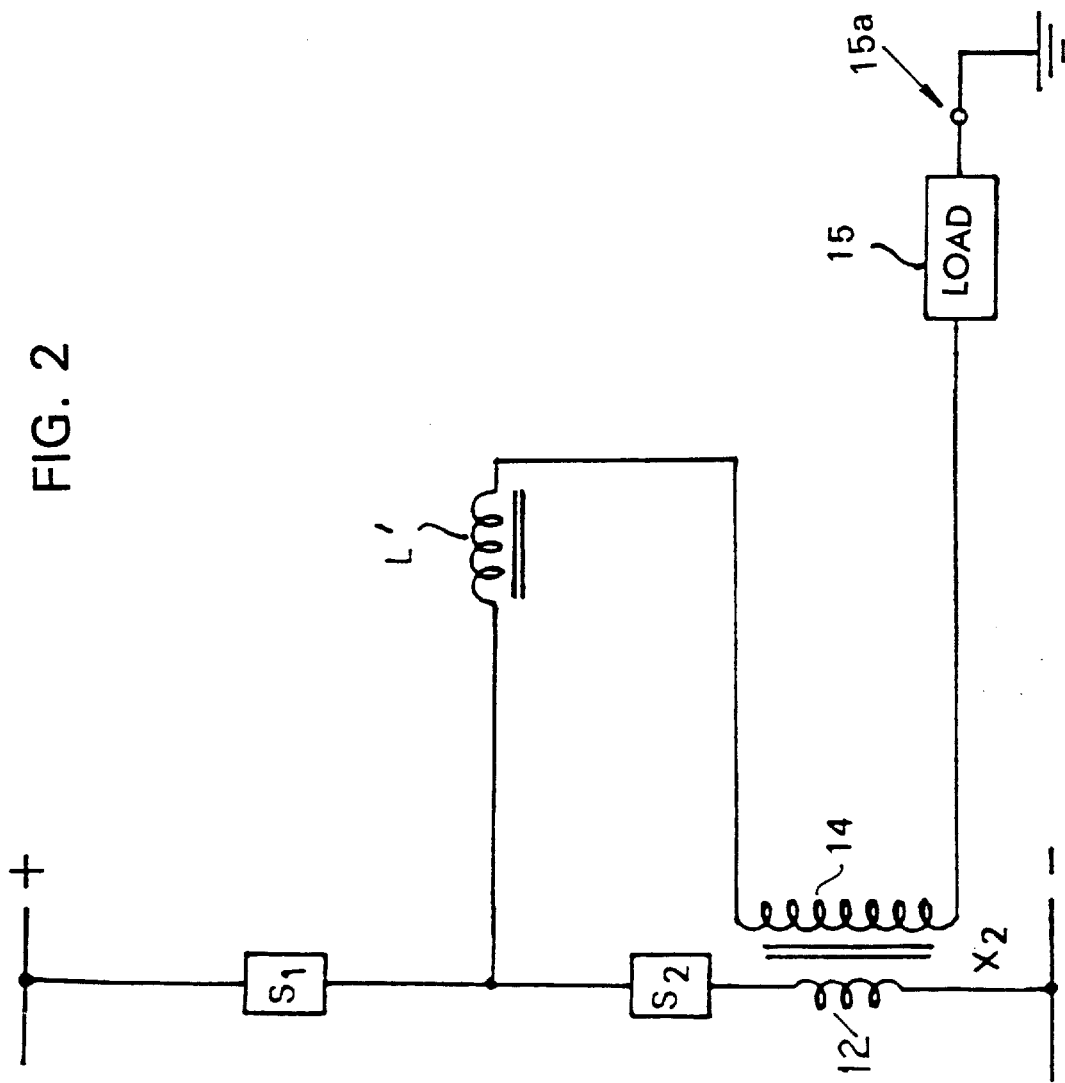
FIG. 2 is a schematic diagram of a circuit of the present invention.
Figure 4A:
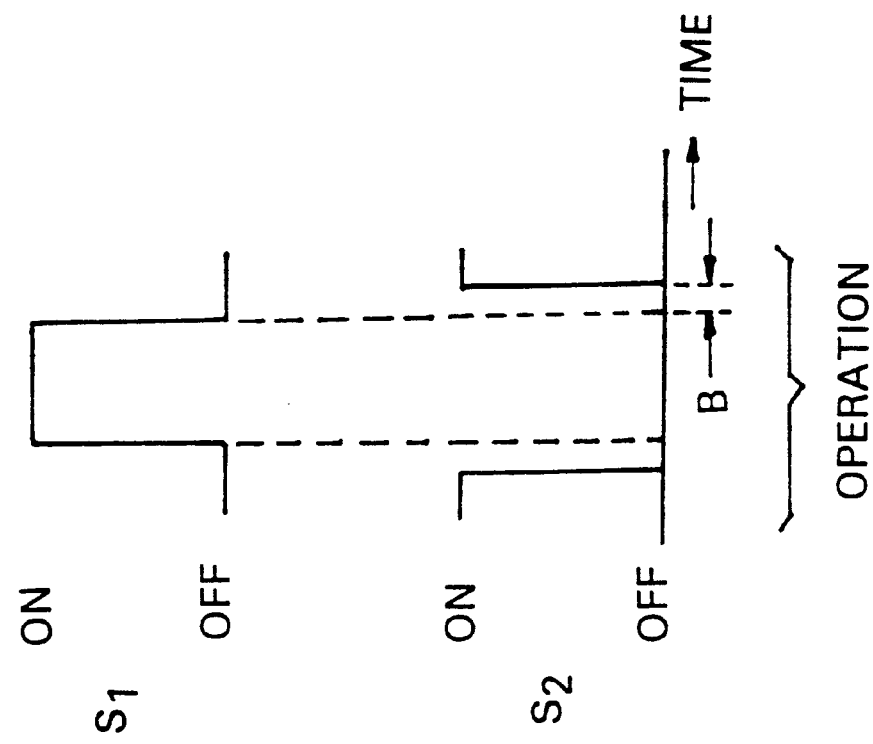
FIG. 4A and 4B are timing diagrams of the states of the two FETs of a ½ bridge during the ignition phase and operation phase respectively according to the invention.

According to the invention, the separate firing circuit comprised of DIAC 10, capacitor $C_1$ and resistor $R_1$ is eliminated. An embodiment of the novel circuit is shown in FIG. 2 where components similar to those of FIG. 1 are given similar identifiers. During the ignition phase of the circuit of FIG. 2, and contrary to conventional circuit design, both $S_1$ and $S_2$ are momentarily and simultaneously intentionally turned "on" (FIG. 4A). This simultaneous turn-on causes an intentional cross-conduction or short across the half-bridge pair of FETs which causes a high shoot-through current through the primary winding 12 of transformer $X_2$, which generates a high voltage pulse on secondary winding 14 which supplies an ignition voltage to the load 15. Once the load is strikes, alternating and non-cross-conducting operation of the switches $S_1$ and $S_2$ resumes (FIG. 4B).

If the embodiment of FIG. 2 is to be carried out as a full bridge, point 5(a) in FIG. 2 would be connected to the other half bridge output.

An embodiment of the inventive circuit in which MOSFETs $FET_1$ and $FET_2$ are used as the switches $S_1$ and $S_2$ respectively and are driven by an appropriate self-oscillating, half-bridge driver IC 16, shown in FIG. 3.

Figure 4B:
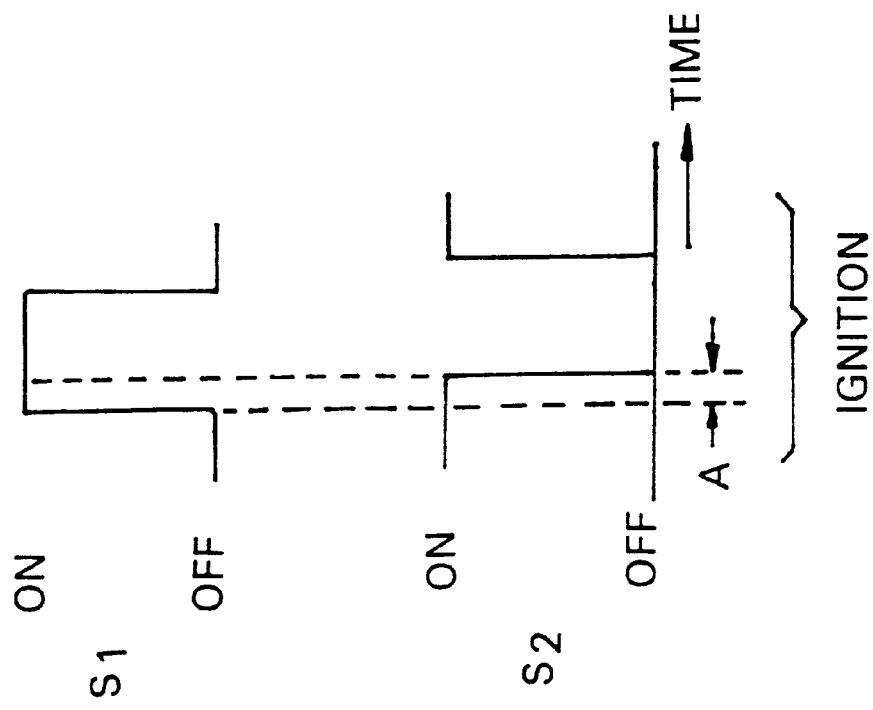

A representation of the states of $S_1$ and $S_2$ of FIG. 2 or MOSFETs $FET_1$ and $FET_2$ of FIG. 3 during the ignition phase and operation phase are shown in FIGS. 4A and 4B, respectively. FIG. 4A shows an initial conduction overlap of the two switches for a time A, which is sufficient to cause ignition of the load 15 (e.g., a lamp). Time A would be dependent on several factors: transformer parasitics, winding ratio, parasitic in lead circuit. Alternatively, the concurrent operation of $S_1$ and $S_2$ shown in FIG. 4A can be repeated until ignition occurs. FIG. 4B shows a dead time B of no conduction of either $S_1$ or $S_2$, during every cycle during operation phase. The operation of $S_1$ and $S_2$ and time B during operation or driving phase is substantially the same as in the prior art.

The inventive circuit can also be used in other applications. For example, it can be used in a motor control circuit to detect a ground fault before the motor is started. Specifically, if load 15 is a motor with a short to ground, the high starting pulse voltage produced in the circuits of FIGS. 2 and 3 will cause a large ground fault current which can be monitored by well known ground fault monitor 20 and the switches turned off.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A circuit for igniting and driving a high ignition voltage resonant load comprising:

first and second series coupled switches connected at a common node located between said first and second switches;

a transformer having a low voltage winding and a high voltage winding, the low voltage winding being coupled in series with the first and second switches, the high voltage winding being coupled between an output node of the switches and the resonant load; and a switch drive circuit coupled to said first and second switches and operable to turn on and off said first and second switches between conduction and non-conduction conditions, the first and second switches being switched on concurrently for a predetermined interval of time to generate voltage across the high voltage winding to ignite the high ignition voltage resonant load.

2. The circuit of claim 1, wherein said switch drive circuit is further capable of operating in a driving mode wherein the first and second switches are alternately turned on and off during any interval of time.

3. The circuit of claim 1, wherein the resonant load includes a gas discharge lamp.

4. The circuit of claim 3, further comprising an inductor coupled between the common node and the high voltage winding of the transformer.

5. The circuit of claim 1, wherein the first and second switches are MOS gated semiconductor devices.

6. The circuit of claim 5, wherein the first and second switches are field effect transistors (FETs).

7. A power supply circuit for delivering power to a load, said circuit comprising:

at least a first and a second switch means connected in series at a common node and connectable to a direct current source;

a control means coupled to and for controlling conduction of each of said first and second switch means;

a transformer having a low voltage winding and a high voltage winding, said low voltage winding being connected in series with said first and second switch means, said high voltage winding being coupled between said common node and said load;

said control means being operable: (i) in a start mode in which both of said first and second switch means are turned on such that a relatively high voltage is induced in said high voltage winding and delivered to said load; and (ii) to alternately turn on one of said first and second switch means for respective periods in which another of said first and second switch means is turned off with a given time delay interval between the turning off of one switch means and turning on of another switch means, thereby to apply alternating current to said load.

8. The circuit of claim 7, wherein the load is a motor, said circuit further comprising a means for monitoring a ground fault.

9. The circuit of claim 7, wherein the load is a resonant load.

10. The circuit of claim 9, wherein the resonant load is a gas discharge lamp.

11. The circuit of claim 7, wherein the first and second switch means are MOS gated semiconductor devices.

12. The circuit of claim 7, wherein the first and second switch means are field effect transistors.

13. A method for driving a resonant load circuit coupled to a half bridge circuit in which a first and second switches are series coupled, the method comprising the steps of:

concurrently operating both switches in their conduction condition for an initial time period; and thereafter continually alternately operating the switches without an overlap of their conduction intervals.

14. The method of claim 13, further comprising the step of providing power from the switches to a high ignition voltage load.

15. A method for controlling the application of alternating current power to a load coupled to a half bridge circuit comprised of a first and second series coupled switch means, the method comprising the steps of:

concurrently operating both switch means in their conductor condition for a short time;

determining whether a ground fault exists while both switch means are conducting; and preventing the application of power to the load if a ground fault is determined to exist.

16. The method of claim 15, wherein the load is a motor.

\* \* \* \* \*